(12) United States Patent
Liang et al.

(10) Patent No.: US 9,314,927 B2
(45) Date of Patent: Apr. 19, 2016

(54) CABLE TIDYING DEVICE AND ELECTRONIC DEVICE WITH CABLE TIDYING DEVICE

(71) Applicant: ScienBiziP Consulting (Shen Zhen) Co., Ltd., Shenzhen (CN)

(72) Inventors: Wei-Kuang Liang, New Taipei (TW); Weng-Tiang Tang, New Taipei (TW); Can Jia, Shenzhen (CN); Pei-Hua Zhang, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 24 days.

(21) Appl. No.: 14/337,510

(22) Filed: Jul. 22, 2014

(65) Prior Publication Data

US 2015/0029646 A1    Jan. 29, 2015

(30) Foreign Application Priority Data

Jul. 23, 2013  (CN) .......................... 2013 1 0309599

(51) Int. Cl.
| | |
|---|---|
| *G06F 1/16* | (2006.01) |
| *B25J 11/00* | (2006.01) |
| *B25J 15/00* | (2006.01) |
| *G06F 1/18* | (2006.01) |

(52) U.S. Cl.
CPC ............ *B25J 11/005* (2013.01); *B25J 15/0028* (2013.01); *G06F 1/16* (2013.01); *G06F 1/1658* (2013.01); *G06F 1/18* (2013.01); *G06F 1/189* (2013.01); *Y10T 29/53913* (2015.01)

(58) Field of Classification Search
CPC combination set(s) only.
See application file for complete search history.

(56) References Cited

U.S. PATENT DOCUMENTS

| | | | | |
|---|---|---|---|---|
| 7,781,676 | B2 * | 8/2010 | Martin ..................... | H02G 3/04 174/135 |
| 8,513,528 | B2 * | 8/2013 | Ishikawa .............. | H05K 5/0247 174/135 |
| 8,804,315 | B2 * | 8/2014 | Zhou ..................... | G11B 33/122 174/68.1 |
| 9,161,100 | B2 * | 10/2015 | Chang .................... | H01R 13/72 |
| 2005/0115735 | A1 * | 6/2005 | Iwai .......................... | H04N 5/64 174/68.1 |
| 2007/0155236 | A1 * | 7/2007 | Shi .......................... | H02G 3/32 439/587 |
| 2012/0099254 | A1 * | 4/2012 | Rogers .................. | G06F 1/1637 361/679.01 |
| 2012/0154992 | A1 * | 6/2012 | Zhou ...................... | G06F 1/181 361/679.01 |
| 2012/0162869 | A1 * | 6/2012 | Li ........................ | H05K 5/0247 361/679.01 |
| 2012/0287563 | A1 * | 11/2012 | Onodera ............... | G06F 1/1632 361/679.01 |

\* cited by examiner

*Primary Examiner* — Lisa Lea Edmonds

(74) *Attorney, Agent, or Firm* — Novak Druce Connolly Bove + Quigg LLP

(57) ABSTRACT

A tidying device to facilitate the securing of a cable to a tidying slot of an enclosure includes a controller and a gripping module mounted to the controller. A gap is defined for receiving the cable. A pressing module is slidably mounted to the controller. An end of the cable is secured to the enclosure. The tidying device is movable relative to the enclosure to move the cable to be aligned with the tidying slot. The pressing module is slidable relative to the controller to engage the cable in the tidying slot under a control of the controller.

19 Claims, 4 Drawing Sheets

CABLE TIDYING DEVICE AND ELECTRONIC DEVICE WITH CABLE TIDYING DEVICE

FIELD

Embodiments of the present disclosure relate to electronic devices, and particularly to cable management in an electronic device.

BACKGROUND

Many electronic devices, such as computers, need a plurality of cables. The cables may, include for example, power cables, data cables, communication lines, or keyboard lines. It is therefore desirable to include some type of cable management apparatus, such as a binding accessory, that allows the various cables to be collected together and attached in a position to improve the use of space and the ease of visual examination inside an electronic device.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Like reference numerals designate corresponding parts throughout the several views of the drawings.

DETAILED DESCRIPTION

Figure 1:
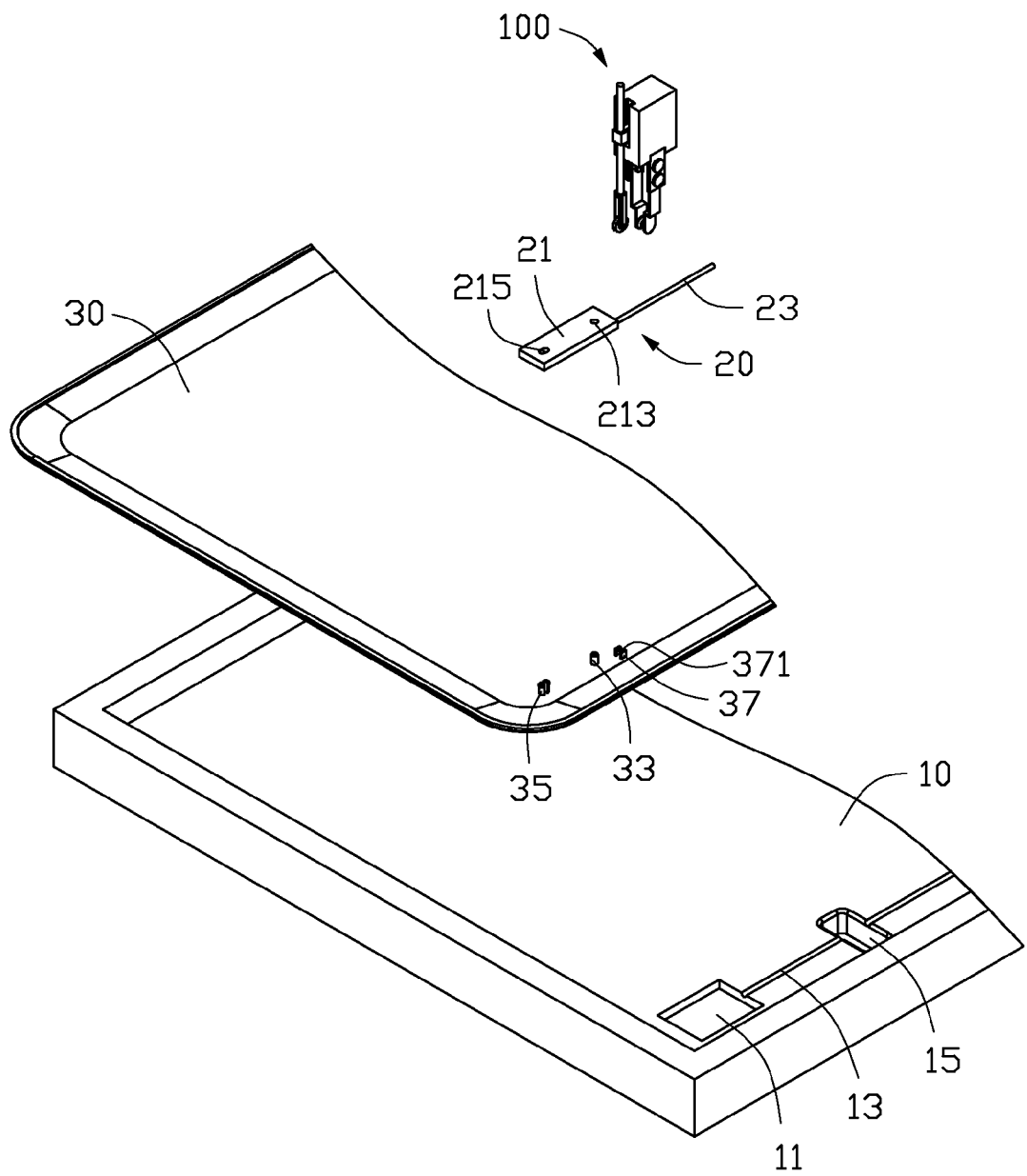
FIG. 1 is an exploded, isometric view of an embodiment of a cable tidying device with an electronic device enclosure, a cable tray, and a cable module.

The disclosure is illustrated by way of example and not by way of limitation in the figures of the accompanying drawings in which like reference numerals indicate similar elements. It should be noted that references to "an" or "one" embodiment in this disclosure are not necessarily to the same embodiment, and such references mean "at least one."

FIG. 1 illustrates one embodiment of a cable tidying device 100. The cable tidying device 100 is configured for securing a cable module 20 to an electronic device enclosure 30 from a cable tray 10.

The cable module 20 includes an installation block 21 and a cable 23. The installation block 21 defines a mounting hole 213 and a latching hole 215. An end of the cable 23 is secured to the installation block 21. The cable tray 10 defines an installation slot 11, a receiving slot 13, and a recess slot 15. The receiving slot 13 communicates with the installation slot 11 by means of the recess slot 15. The installation block 21 is positioned in the installation slot 11. The cable 23 is received in the receiving slot 13. The electronic device enclosure 30 comprises a mounting post 33 corresponding to the mounting hole 213, a latching portion 35 corresponding to the latching hole 215, and a pair of hooks 37. The pair of hooks 37 defines a tidying slot 371 therebetween.

Figure 2:
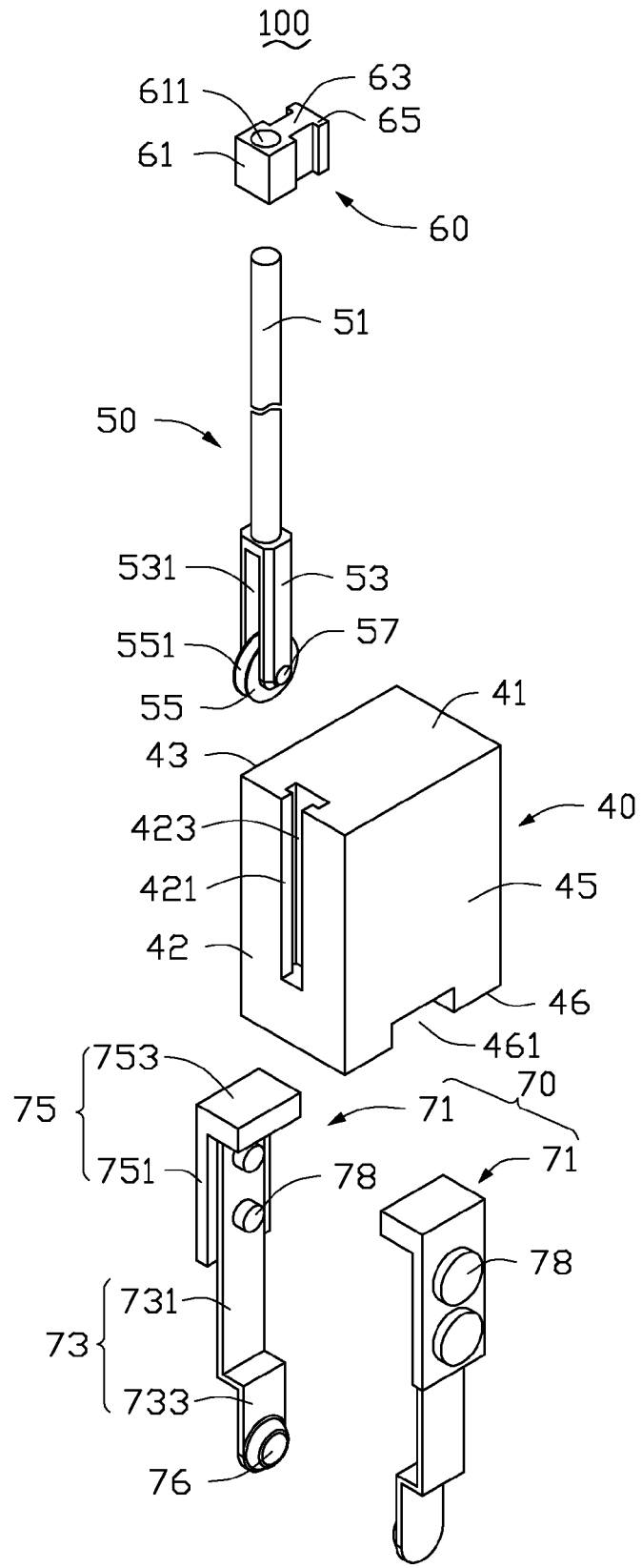
FIG. 2 is an exploded, isometric view of the cable tidying device of FIG. 1.
Figure 3:
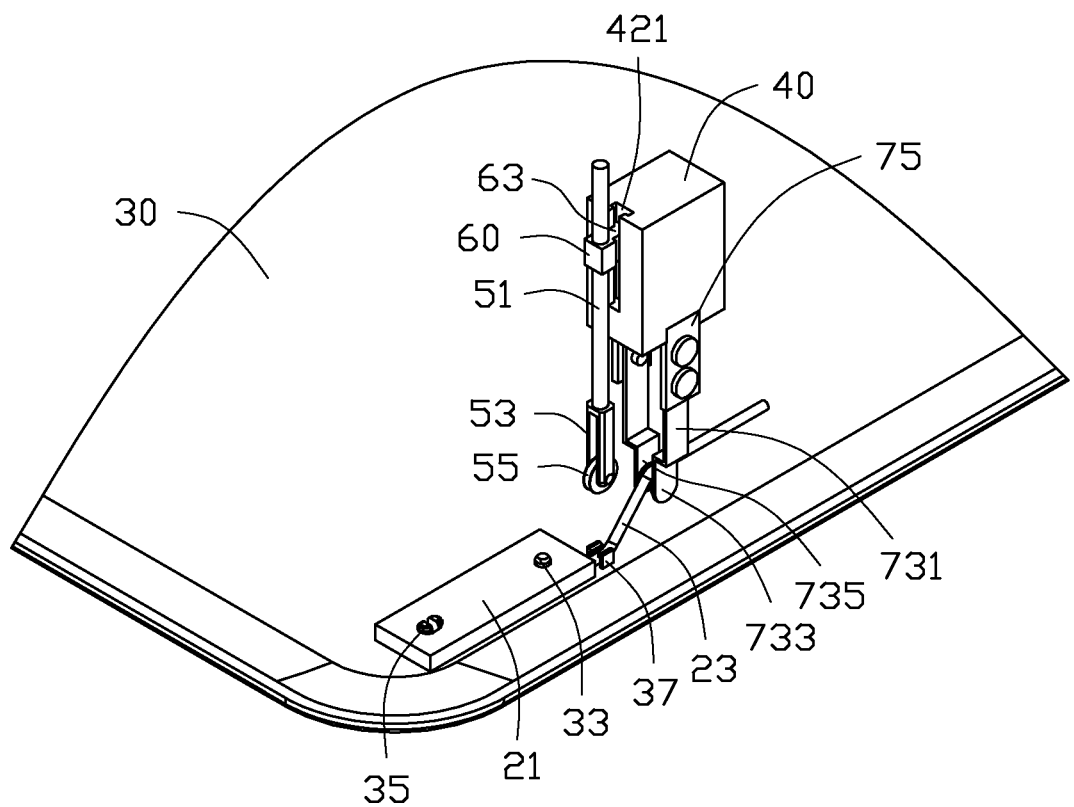
FIG. 3 is an assembled, isometric view of the cable tidying device, the electronic device enclosure, and the cable module of FIG. 1.
Figure 4:
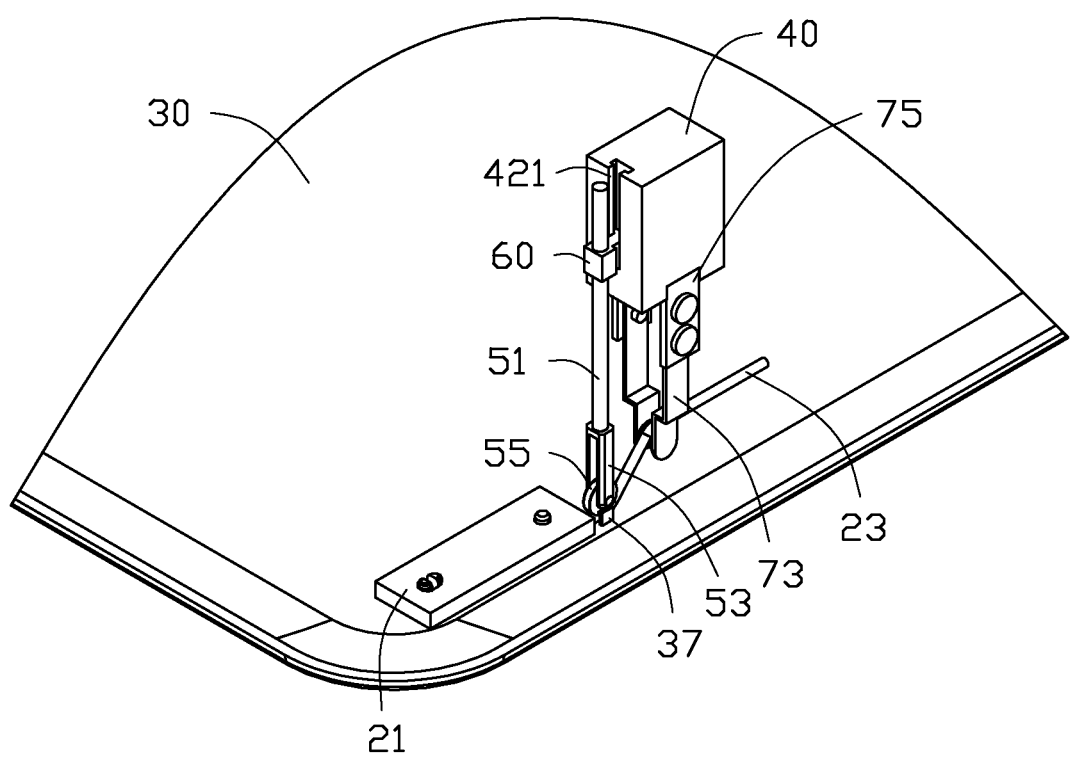
FIG. 4 is similar to FIG. 3, but shows the cable tidying device in a different position.

FIG. 2 illustrates the cable tidying device 100 including a controller 40, a pressing module 50, a sliding member 60, and a gripping module 70.

The controller 40 is configured for driving the pressing module 50 and the gripping module 70 to move. The controller 40 includes a top wall 41, a front wall 42, a first sidewall 43, a second sidewall 45, and a bottom wall 46. In one embodiment, the top wall 41 is substantially parallel to the bottom wall 46, the first sidewall 43 is substantially parallel to the second sidewall 45, the top wall 41 is substantially perpendicular to the front wall 42 and the first sidewall 43, and the first sidewall 43 is substantially perpendicular to the bottom wall 46. The front wall 42 defines a sliding slot 421 and a limiting slot 423 communicating with the sliding slot 421. A width of the sliding slot 421 is less than a width of the limiting slot 423. The bottom wall 46 defines a cutout 461. The cutout 461 extends through the first sidewall 43 and the second sidewall 45 and is configured for movably mounting the gripping module 70.

The pressing module 50 can include a mounting shaft 51, an installation portion 53, and a pressing wheel 55. The installation portion 53 is secured to a distal end of the mounting shaft 51 and defines a through slot 531. An installation shaft 57 is secured to the installation portion 53 through the pressing wheel 55, to rotatably mount the pressing wheel 55 in the through slot 531. The pressing wheel 55 defines a pressing slot 551.

The sliding member 60 includes a limiting portion 61, a sliding portion 63, and a positioning portion 65. The sliding portion 63 is located between the limiting portion 61 and the positioning portion 65. The limiting portion 61 defines a through hole 611 for slidably receiving the mounting shaft 51. The sliding portion 63 can be slidably received in the sliding slot 421. The positioning portion 65 can be slidably received in the limiting slot 423.

The gripping module 70 can include two gripping members 71. Each gripping member 71 includes a gripping plate 73 and a mounting plate 75. The gripping plate 73 includes a locking piece 731 and a gripping piece 733 connected to the locking piece 731. In at least one embodiment, the locking pieces 731 of the two gripping members 71 are substantially parallel to each other, and the gripping pieces 733 of the two gripping members 71 are substantially parallel to each other. A distance between the locking pieces 731 is greater than a distance between the gripping pieces 733. A gripping block 76 extends inwards from each gripping piece 733. The mounting plate 75 includes a mounting piece 751 and an installation piece 753 perpendicularly connected to the mounting piece 751. The locking piece 731 is secured to the mounting piece 751 by a fastener 78, such as a screw.

FIGS. 1-4 illustrate the assembly of the cable tidying device 100, the positioning portion 65 is aligned with the limiting slot 423, and the sliding portion 63 is aligned with the sliding slot 421. The sliding member 60 is moved downwards, allowing the sliding portion 63 to be slidably received in the sliding slot 421, and the positioning portion 65 is slidably received in the limiting slot 423. The mounting shaft 51 is secured to the limiting portion 61 through the through hole 611. Thus, the sliding portion 60 enables the pressing module 50 to slide relative to the controller 40. The installation piece 753 is movably mounted to a bottom end of the controller 40 to drive the two pressing plates 73 to move towards each other or away from each other. In this embodiment, the installation piece 753 is slidably received in the cutout 461. In other embodiments, the installation piece 753 includes a pivoting shaft, the controller 40 defines a pivoting hole, and the pivoting shaft is pivotably received in the pivoting hole, to pivotably mount the gripping member 71 to the controller 40. A gap 735 is defined between the two gripping pieces 733.

The gripping module 70 is movable relative to the controller 40 between a gripping position and a releasing position under a control of the controller 40. When the gripping module 70 is in the gripping position, a first distance is defined between the two gripping blocks 76, and the first distance is less than a width of the cable 23. When the gripping module 70 is in the releasing position, a second distance is defined between the two gripping blocks 76, and the second distance is greater than the width of the cable 23.

The pressing module 50 is slidable relative to the controller 40 between a first position and a second position under the control of the controller 40. When the pressing module 50 is in the first position, a first distance between the pressing wheel 55 and a horizontal plane is greater than a distance between the gripping block 76 and the horizontal plane. When the pressing module 50 is in the second position, a second distance between the pressing wheel 55 and the horizontal plane is less than the distance between the gripping block 76 and the horizontal plane.

In use, the cable module 20 is secured in the cable tray 10. The installation block 21 is located in the installation slot 11, and the cable 23 extends along the recess slot 15. The tidying device 100 is secured to a movable device (not shown), such as a manipulator. The controller 40 controls the gripping module 70 in the released position, and the pressing module 50 is in the first position. The manipulator moves the tidying device 100 to be adjacent to the cable module 20, the two gripping pieces 733 extend into the recess slot 15, causing the cable 23 to be located in the gap 735. The controller 40 controls the gripping module 70 to grip, the cable 23 is gripped in the gap 735, and the two gripping blocks 76 prevent the cable 23 from disengaging from the gap 735. The installation block 21 is sucked by a sucker (not shown). The sucker and the manipulator cooperatively move the cable 23 in the enclosure 30. The installation block 21 is secured to the enclosure 30, the mounting post 33 is mounted in the mounting hole 213, and the latching portion 35 is mounted in the latching hole 215. The manipulator moves the tidying device 100 to be located above the hook 37. The controller 40 slides the pressing module 50 from the first position to the second position, causing the cable 23 to be pressed into the pressing slot 551, and the cable 23 is pressed into the tidying slot 371. Thus, the cable 23 is secured to the enclosure 30. The controller 40 controls the pressing module 50 to slide back to the first position and the gripping module 70 is then in the releasing position, allowing another cable module 20 to be secured to the enclosure 30.

It is to be understood, however, that even though numerous characteristics and advantages have been set forth in the foregoing description of embodiments, together with details of the structures and functions of the embodiments, the disclosure is illustrative only and changes may be made in detail, including in the matters of shape, size, and the arrangement of parts within the principles of the disclosure. The above-described embodiments are illustrative only, and should not be construed as limiting the following claims.

What is claimed is:

1. A tidying device for securing a cable to a tidying slot of an enclosure, the tidying device comprising:
    a controller;
    a gripping module mounted to the controller and defining a gap configured for receiving the cable; and
    a pressing module slidably mounted to the controller;
    wherein the tidying device is movable relative to the enclosure to move the cable to be aligned with the tidying slot; and the pressing module is slidable relative to the controller to engage the cable in the tidying slot under a control of the controller.

2. The tidying device of claim 1, wherein the gripping module is movably mounted to the controller.

3. The tidying device of claim 2, wherein the gripping module comprises two opposite gripping members, each gripping member comprises a gripping piece, and the gap is defined between the gripping pieces of the two gripping members; and a gripping block protrudes from the gripping piece and configured for gripping the cable.

4. The tidying device of claim 3, wherein the gripping module is movable relative to the controller between a gripping position and a released position; when the gripping module is in the gripping position, a first distance is defined between the two gripping blocks of the two gripping members, and the first distance is less than a width of the cable; and when the gripping module is in the released position, a second distance is defined between the two gripping blocks of the two gripping members, and the second distance is greater than the width of the cable.

5. The tidying device of claim 3, wherein each gripping member further comprises a locking piece and a mounting plate, the gripping piece extends from the locking piece, the locking piece is secured to the mounting plate, and the mounting plate is movably mounted to the controller.

6. The tidying device of claim 5, wherein the locking pieces of the two gripping members are substantially parallel to each other, the gripping pieces of the two gripping members are substantially parallel to each other, and a distance between the locking pieces is greater than a distance between the griping pieces.

7. The tidying device of claim 3, further comprising a sliding member, wherein the controller defines a sliding slot, and the sliding member is slidably received in the sliding slot; and the pressing module further comprises a mounting shaft secured to the sliding member.

8. The tidying device of claim 7, wherein the pressing module further comprises an installation portion connected to the mounting shaft and a pressing wheel rotatably received in the installation portion, the pressing wheel defines a pressing slot, and the cable is pressed in the tidying slot through the pressing slot.

9. The tidying device of claim 8, wherein the pressing module is slidable relative to the controller between a first position and a second position, when the pressing module is in the first position, a distance between the pressing wheel and a horizontal plane is greater than a distance between the gripping block and the horizontal plane; and when the pressing module is the second position, the distance between the pressing wheel and the horizontal plane is less than the distance between the gripping block and the horizontal plane.

10. The tidying device of claim 1, wherein the gripping module is slidable relative to the controller, and a sliding direction of the pressing module is substantially perpendicular to a sliding direction of the gripping module.

11. An electronic device comprising:
    an enclosure defining a tidying slot;
    a cable with an end secured to the enclosure; and
    a tidying device comprising:
        a controller;
        a gripping module mounted to the controller and defining a gap configured for receiving the cable, and the gripping module comprising a two gripping blocks in the gap; and
        a pressing module slidably mounted to the controller;

wherein an end of the cable is secured to the enclosure; the gripping module is movable relative to the controller between a gripping position and a released position; when the gripping module is in the gripping position, a first distance is defined between the two gripping blocks, and the first distance is less than a width of the cable, preventing the cable from being removed from the gap; and when the gripping module is in the released position, a second distance is defined between the two gripping blocks, and the second distance is greater than the width of the cable, allowing the cable to be received in the gap; the tidying device is movable relative to the enclosure to move the cable to be aligned with the tidying slot; and the pressing module is slidable relative to the controller to engage the cable in the tidying slot under a control of the controller.

12. The electronic device of claim 11, wherein the gripping module is movably mounted to the controller.

13. The electronic device of claim 12, wherein the gripping module further comprises two opposite gripping members, each gripping member comprises a gripping piece, and the gap is defined between the gripping pieces of the two gripping members; and each gripping block protrudes from the gripping piece.

14. The electronic device of claim 13, wherein each gripping member further comprises a locking piece and a mounting plate, the gripping piece extends from the locking piece, the locking piece is secured to the mounting plate, and the mounting plate is movably mounted to the controller.

15. The electronic device of claim 14, wherein the locking pieces of the two gripping members are substantially parallel to each other, the gripping pieces of the two gripping members are substantially parallel to each other, and a distance between the locking pieces is greater than a distance between the griping pieces.

16. The electronic device of claim 11, further comprising a sliding member, wherein the controller defines a sliding slot, and the sliding member is slidably received in the sliding slot; and the pressing module further comprises a mounting shaft secured to the sliding member.

17. The electronic device of claim 16, wherein the pressing module further comprises an installation portion connected to the mounting shaft and a pressing wheel rotatably received in the installation portion, the pressing wheel defines a pressing slot, and the cable is pressed in the tidying slot through the pressing slot.

18. The electronic device of claim 17, wherein the pressing module is slidable relative to the controller between a first position and a second position, when the pressing module is in the first position, a distance between the pressing wheel and a horizontal plane is greater than a distance between the gripping block and the horizontal plane; and when the pressing module is the second position, the distance between the pressing wheel and the horizontal plane is less than the distance between the gripping block and the horizontal plane.

19. The electronic device of claim 11, wherein the gripping module is slidable relative to the controller, and a sliding direction of the pressing module is substantially perpendicular to a sliding direction of the gripping module.

* * * * *